United States Patent [19]

Neilson et al.

[11] Patent Number: 4,916,530
[45] Date of Patent: Apr. 10, 1990

[54] HIGH RESOLUTION HALFTONE DOT GENERATOR SYSTEM INCLUDING LED ARRAY

[75] Inventors: Peter J. Neilson, Horsley; Nicholas P. Cook, Robert C. Holt; all of Cheltenham, England

[73] Assignee: Itek Graphix Corp., Waltham, Mass.

[21] Appl. No.: 241,100

[22] Filed: Sep. 2, 1988

[51] Int. Cl.[4] ............................................. H04N 1/40
[52] U.S. Cl. ....................................... 358/75; 358/429; 358/483; 358/455
[58] Field of Search .............. 358/429, 456, 455, 459, 358/460, 465, 75, 213.11, 483

[56] References Cited

U.S. PATENT DOCUMENTS

| | | | |
|---|---|---|---|
| 3,725,574 | 4/1973 | Gast | 350/150 |
| 3,850,517 | 11/1974 | Stephany | 354/12 |
| 3,912,556 | 10/1975 | Grenon | 148/0.75 |
| 3,932,927 | 1/1976 | Grenon | 29/577 |
| 3,940,756 | 2/1976 | Findlay | 340/324 M |
| 3,947,840 | 3/1976 | Craford | 340/324 M |
| 3,952,311 | 4/1976 | Lapeyre | 354/5 |
| 3,961,132 | 6/1976 | Landsman | 178/6.7 R |
| 3,997,911 | 12/1976 | Perriman | 358/75 |
| 4,051,536 | 9/1977 | Roetling | 358/298 |
| 4,096,486 | 6/1978 | Pfeifer | 346/607 R |
| 4,107,687 | 8/1978 | Pfeifer | 346/107 R |
| 4,149,194 | 4/1979 | Holladay | 358/283 |
| 4,149,195 | 4/1979 | Gast | 358/283 |
| 4,182,025 | 1/1980 | Wickenden | 29/577 R |
| 4,185,304 | 1/1980 | Holladay | 358/298 |
| 4,280,273 | 7/1981 | Vincent | 29/577 R |
| 4,318,597 | 3/1982 | Kotani | 354/5 |
| 4,342,504 | 8/1982 | Ebner | 354/7 |
| 4,350,996 | 9/1982 | Rosenfeld | 358/75 |
| 4,353,628 | 10/1982 | Berman | 354/5 |
| 4,365,275 | 12/1982 | Berman | 358/283 |
| 4,376,282 | 3/1983 | Kotani | 346/107 R |
| 4,378,149 | 3/1983 | Ebner | 354/5 |
| 4,449,150 | 5/1984 | Kato | 358/456 |
| 4,456,924 | 6/1984 | Rosenfeld | 358/75 |
| 4,471,375 | 9/1984 | Oritsuki et al. | 358/483 |
| 4,499,489 | 2/1985 | Gall | 358/75 |
| 4,514,100 | 4/1985 | LaSpesa | 400/55 |
| 4,571,602 | 2/1986 | DeSchamphelaere | 346/160 |
| 4,588,883 | 5/1986 | Abbas | 250/205 |
| 4,633,280 | 12/1986 | Takasu | 357/17 |
| 4,644,342 | 2/1987 | Abbas | 340/762 |
| 4,665,440 | 5/1987 | Tromberg | 358/483 |
| 4,733,127 | 3/1988 | Takasu | 313/500 |
| 4,734,714 | 3/1988 | Takasu | 346/107 R |
| 4,821,109 | 4/1989 | Roe | 358/456 |

FOREIGN PATENT DOCUMENTS

| | | |
|---|---|---|
| 0112518 | 4/1984 | European Pat. Off. |
| 0276126 | 7/1988 | European Pat. Off. |
| 2527894 | 3/1977 | Fed. Rep. of Germany |
| 2099221A | 12/1982 | United Kingdom |
| 2206011A | 12/1988 | United Kingdom |

OTHER PUBLICATIONS

"Product Update: Color Scanners", Graphic Arts Monthly, Mar., 1987, p. 50.
R. J. Klensch, et al., "Electronically Generated Halftone Pictures", RCA Review, pp. 517–533, Sep., 1970.
B. E. Bayer, "An Optimum Method for Two-Level Rendition of Continuous Tone Pictures", IEEE International Conference on Communications, vol. 1, 1973.

Primary Examiner—James J. Groody
Assistant Examiner—Jerome Grant
Attorney, Agent, or Firm—Morgan & Finnegan

[57] ABSTRACT

A dot generator system is provided wherein an LED microchip array having staggered rows of LED's imaged onto the surface of a rotating exposure drum is controlled to create a multiple exposure beam microdot image on the drum surface in a microdot line by microdot line and scanline by scanline exposure scan. Picture values are compared to microdot density values recalled from a dot density profile array using address values incremented with microdot, flyback and scanline increment values in order to produce exposure data bits indicating whether each active LED on the array is to be turned on. Exposure data bits are accumulated into an exposure data word equal in length to the number of active LED's on the LED array and stagger compensation time delays are applied to exposure bits corresponding to the second and subsequent staggered LED rows to create a timed microdot line exposure on the drum surface.

28 Claims, 5 Drawing Sheets

HIGH RESOLUTION HALFTONE DOT GENERATOR SYSTEM INCLUDING LED ARRAY

TECHNICAL FIELD

The present invention relates to a high resolution dot generator system for use in color scanners and, more specifically, to a dot generator system including a light emitting diode ("LED") array and a system for controlling the array.

BACKGROUND AND OBJECTS OF THE INVENTION

Multiple color printing processes require production of color halftone separations which are used to make printing plates corresponding to each color ink to be printed. In a traditional four color printing process it is necessary to produce cyan, magenta, yellow and black halftone separations which are used to make corresponding printing plates for printing cyan, magenta, yellow and black process inks.

Originally, halftone separations were made on a camera by projecting an image of the original artwork through a color filter and a halftone screen of the desired pitch and angle onto photosensitive film. The camera procedure required substantial training with various techniques and was tedious and error prone. With the advent of electronic imaging, camera halftone techniques gave way to electronic color scanners. In an electronic color scanner the original artwork is scanned, typically in a line by line and pixel by pixel fashion, and an electronically controlled beam of light exposes a simulated halftone separation onto photosensitive film. Electronic color correction, unsharp masking and under color removal are commonly provided and, of course, the effects of halftone screens must be electronically reproduced.

To be competitive, modern color scanners must provide high resolution halftone images. In practice, this is accomplished by exposing a number of high resolution "microdots" or "dotels" to produce each halftone dot. Modern high quality scanners commonly use laser-based dot generators to produce the requisite high resolution microdots, e.g. in excess of 2,500 microdots per inch. Lasers have been found satisfactory since many types of lasers operate in the blue and green regions of the spectrum, which is appropriate for exposing orthochromatic film, and lasers can be controlled to produce concentrated, high intensity beams of light.

Lasers, however, are costly and difficult to incorporate into a scanning dot generator. Moreover, it has been found that lasers can produce only a limited, small number of exposure beams. Thus, high quality contemporary scanners incorporating laser dot generators are very expensive and, as a practical matter, are limited to approximately 8 to 10 exposure beams.

Lower resolution scanning printheads, such as for low cost phototypesetting and scanning, have used LED's to expose photosensitive materials. See U.S. Pat. No. 4,378,149 issued to Ebner entitled "High Speed, Low-Cost Character Printer", U.S. Pat. No. 4,342,504 issued to Ebner entitled "LED-Fiber Optic Character Printer", U.S. Pat. No. 3,952,311 issued to Lapeyre entitled "Electro-Optical Printing System", U.S. Pat. No. 4,096,486 issued to Pfeifer entitled "Recorder", U.S. Pat. No. 4,107,687 issued to Pfeifer entitled "Recording Device" and U.S. Pat. No., 3,850,517 issued to Stephany entitled "High Speed Printout System". More recently, monolithic LED arrays have been produced See U.S. Pat. No. 4,734,714 issued to Takasu entitled "Optical Print Head With LED Diode Array", and U.S. Pat. No. 4,644,342 issued to Abbas entitled "Array Of Light Emitting Diodes For Producing Gray Scale Light Images". U.K. Patent Application No. 2,099,221 entitled "Light Emitting Diode Array Devices and Image Transfer Systems" discloses one or two row monolithic LED arrays having up to 1000 light emitting areas per inch.

Notwithstanding the foregoing disclosures, no suitable LED dot generator source capable of producing microdots at the high resolution and intensity required for high quality color scanning is known. Indeed, only U.S. Pat. No. 4,365,275 issued to Berman entitled "Method For Producing Images On Radiation Sensitive Recording Mediums" makes any attempt to use an LED source in a color scanner. Yet Berman resorts to conducting light from individual LED sources through optical fibers to a matrix array which is optically reduced in an exposing head. Although Berman claims to obtain 22,500 dot areas per square inch, the system there disclosed is not known to have found substantial commercial acceptance.

To the contrary, to date the color scanner industry has not adopted any LED source as yielding acceptable color scanning separations. Rather, the numerous drawbacks of heretofore known LED sources, including fabrication difficulties, inconsistent light output, and fewer types of photosensitive material responsive to the red light customarily produced by LED's, have led to the general perception in the color scanner industry that LED devices are inappropriate for use as a light source in high quality color scanner dot generators. Improvements have been made in photosensitive materials responsive to red light, but to date no reliable high resolution, high intensity LED source has been proposed for use in a color scanner.

In addition, it has long been known that the effects of a halftone screen may be electronically simulated by storing a "dot density profile" of a halftone dot, recalling individual microdot density values from the dot density profile using trigonometrically rotated address values, and superimposing the microdot density value onto a picture signal to determine whether a microdot exposure is to be made. See Landsman U.S. Pat. No. 3,961,132. It is also known that trigonometric address rotation may be performed by successively incrementing the address values. See Gall U.S. Pat. No. 4,499,489. Rosenfeld U.S. Pat. Nos. 4,350,996 and 4,456,924 also relate to addressing a stored dot density profile using trigonometrically transformed addresses. However, the foregoing systems for electronically generating halftone screens generally relate to laser beam exposure devices and, more particularly, to systems in which a single dot generator controls but a single laser exposure beam. For example, Gall discloses an address sequencing system for controlling a single laser beam which makes a scanning exposure in the scan line direction around the circumference of a rotating drum. Although Gall suggests that multiple exposure beams could be provided, including multiple beams created by a line of LED's, Gall teaches that a plurality of screen generators are necessary for such a multiple beam system (see Gall col. 12, lines 28–31).

Therefore, it is one object of the present invention to provide a relatively low cost halftone dot generator capable of producing high resolution microdots on a photosensitive surface.

A further object of the present invention is to provide a halftone dot generator including an LED source capable of producing high resolution microdot images on a photosensitive material.

Another object of the present invention is to provide a compact and lightweight LED array appropriate for use as the exposure source in a dot generator system for a high quality color scanner.

It is yet a further object of the present invention to provide an LED array dot generator system for creating multiple microdot exposure beams.

Another object of the present invention is to provide a dot generator system and method for controlling activation of an LED array to create multiple exposure beams for exposing a screened halftone image onto photosensitive film.

It is yet a further object of the present invention to provide a dot generator system and method capable of controlling multiple LED exposure beams with a single dot generator.

These and other highly desirable and unusual results are accomplished by the present invention in an economical, lightweight and compact LED dot generator system appropriate for use in a color scanner to produce high resolution separation images.

Objects and advantages of the invention are set forth herein and in part will be obvious herefrom, or may be learned by practice with the invention, the same being realized and attained by means of instrumentalities and combinations pointed out in the appended claims.

The invention consists of the novel parts, constructions, arrangements, combinations, steps and improvements herein shown and described.

SUMMARY OF THE INVENTION

In accordance with the present invention, there is provided a multiple beam halftone dot generator system including an LED array with staggered rows of LED's. Advantageously, one dot generator is used to control activation of the LED's on the LED array to produce a multiple beam microdot exposure.

The preferred LED microchip array has four staggered rows of six LED's in each row. The LED's are formed in a known manner in a substrate which acts as a common connection. A first insulation layer is deposited over the substrate surrounding the LED wells and individual electrodes, one surrounding and contacting each LED well, are led in a unique pattern to the periphery of the monolithic chip for contact with the LED array drive circuitry. Briefly stated, the electrodes for the LED's of the top and bottom rows are led upward and downward, respectively, to contact points disposed on the top and bottom chip edges, whereas the contact electrodes for three LED's in each of the middle rows are led to each side of the chip for contact. This unique electrode pattern, together with the configuration of the staggered array, advantageously obtain high intensity exposures for high resolution microdots with effective thermal dissipation. A second insulation layer is disposed over the electrode layer. In order to prevent undesirable light variations caused by light from the LED's escaping through the substrate to the sides of the LED's, a metalised masking layer is disposed over the entire array. The second insulation layer electrically isolates the metalised masking layer from the electrodes.

In practice, the lightweight and compact LED microchip array is mounted with associated optics on a transport carriage opposite the exposure surface of a color separation scanner. Preferably, the LED microchip array is mounted opposite the surface of a rotating exposure drum and is selectively activated in accordance with the preferred dot generator system to obtain microdot resolutions in excess of 2,800 dots per inch. Further in accordance with the invention, the dot generator advantageously includes a single dot generator system connected to the LED chip array for controlling activation of all LED's. The scanner also includes an original artwork input scanner for scanning original artwork to generate picture pixel values for each color separation.

In accordance with the dot generator system and method of the present invention for controlling the LED array, a scanned picture value for a given color separation is compared to a microdot density value recalled from a halftone dot density profile array ("DDPA") addressably stored in random access memory ("RAM"), and a determination is made whether a corresponding microdot is to be exposed by activating an LED on the LED array. Bit slices are provided for incrementing the x and y DDPA address parameters and maintaining a running total of the DDPA address during ongoing scanning. Advantageously, the bit slices may simply be 32 bit adders with on board memory capable of storing microdot line increment values, flyback increment values, scanline increment values and a running address total for each halftone separation. During exposure scanning of a separation, the bit slices sequentially increment the running total DDPA address across the microdot line to be produced in order to recall from the DDPA the microdot density value corresponding to each microdot in a microdot line perpendicular to the direction of rotation of the exposure drum, i.e. the axial direction, up to the number of active LED's on the LED array. Each microdot density value recalled from the DDPA is compared to a picture value to determine whether each active LED in the array is to be turned on to expose a microdot on the microdot line. After sequencing the DDPA address across a microdot line, the bit slices increment the running total DDPA address with a "flyback" increment in order to reach the DDPA address corresponding to the first microdot of the next microdot line to be exposed on the exposure drum. Address incrementing continues in this manner microdot by microdot and microdot line by microdot line until the end of a scanline exposure in the circumferential direction around the drum, at which time the bit slices increment the starting DDPA address by a "scanline" increment value to reach the DDPA address corresponding to the first microdot of the first microdot line of the next scanline in the axial drum direction. DDPA addressing continues in this manner incrementing microdot by microdot, microdot line by microdot line, and scanline by scanline until a given separation scan is complete. Advantageously, overflow of the running total DDPA address may be ignored since the DDPA is symetrical and the remaining portion of the address effectively corresponds to the address within the next symetrical halftone dot to be produced.

A compare logic compares each microdot density value recalled from the DDP with a corrected picture value from the scanned original artwork to determine whether an LED is to be activated to expose a corresponding microdot on the halftone separation. Preferably, negative microdot density values are stored in the DDPA, with the compare logic adding the negative microdot density value to the positive picture value and looking at the sum to determine whether the corresponding LED is to be activated. The compare logic outputs a single data bit indicating whether an exposure is to occur at a given microdot, i.e. whether the corresponding LED is to be activated. A serial to parallel converter accumulates exposure data from the compare logic and constructs a word equal in length to the number of LED's in use on the LED array and, hence, equal to the number of microdots on a single microdot exposure line on the rotating exposure drum.

Because the LED array does not consist of a single line of LED's, a stagger compensation logic is provided to coordinate activation of each LED in the staggered LED rows in order to expose a single, aligned microdot line from one word of microdot exposure data received from the serial to parallel converter. The stagger compensation logic transmits the exposure data bits corresponding to the first row of LED's without delay to an output buffer connected to the array. However, exposure data bits corresponding to the second and subsequent staggered LED rows are delayed from being transmitted to the output buffer and LED array for a period of time corresponding to the time required for the exposure drum to rotate until each staggered row is aligned with the point on the drum surface where the first row of LED's were activated in response to corresponding exposure data. Advantageously, the output buffer and LED may receive bits of data for each LED row corresponding to different microdot lines, so that each row of the LED array exposes a different portion of different microdot lines during a single stroke pulse.

A clock generator controls the time delay introduced by the stagger compensation logic, transmittal of exposure data from the output buffer to the LED array, activation of the LED array with a stroke pulse, and transmission of a signal to the picture value source to obtain a new picture value. A bit slice control monitors the output buffer to coordinate addressing of the DDPA RAM and comparison of microdot density values to picture values with availability of the serial to parallel converter. That is, transmittal of an exposure data word the output buffer to the LED array also triggers transmittal of a word from the stagger compensation logic to the output buffer and from the serial to parallel converter to the stagger compensation logic. Thus, transmittal of data from the output buffer to the LED array is indicative of availability of the serial to parallel converter to receive new data from the compare logic.

The LED dot generator system in accordance with the present invention advantageously provides a low cost multiple beam LED exposure source capable of providing high resolution halftone separation exposures. Advantageously, the unique configuration of the highly compact LED array obtains high intensity exposure from each LED with effective thermal dissipation. Remarkably, in the LED dot generator system operated in accordance with the present invention the multiple beam LED array is controlled with a single electronic dot generator, thereby further reducing the cost and complexity of the dot generator. Significantly, the LED dot generator system in accordance with the invention obviates the need for expensive, bulky and complex laser sources traditionally used in high quality color separation scanners.

It will be understood that the foregoing general description and the following detailed description as well are exemplary and explanatory of the invention but are not restrictive thereof.

BRIEF DESCRIPTION OF THE DRAWINGS

The accompanying drawings, referred to herein and constituting a part hereof, illustrate preferred embodiments of the present invention, and together with the description serve to explain the principles of the invention, in which.

DETAILED DESCRIPTION OF THE PREFERRED EMBODIMENTS

In accordance with the present invention an LED dot generator system is provided including an LED microchip array controlled by a single dot generator to produce multiple exposure beams.

Figure 1:
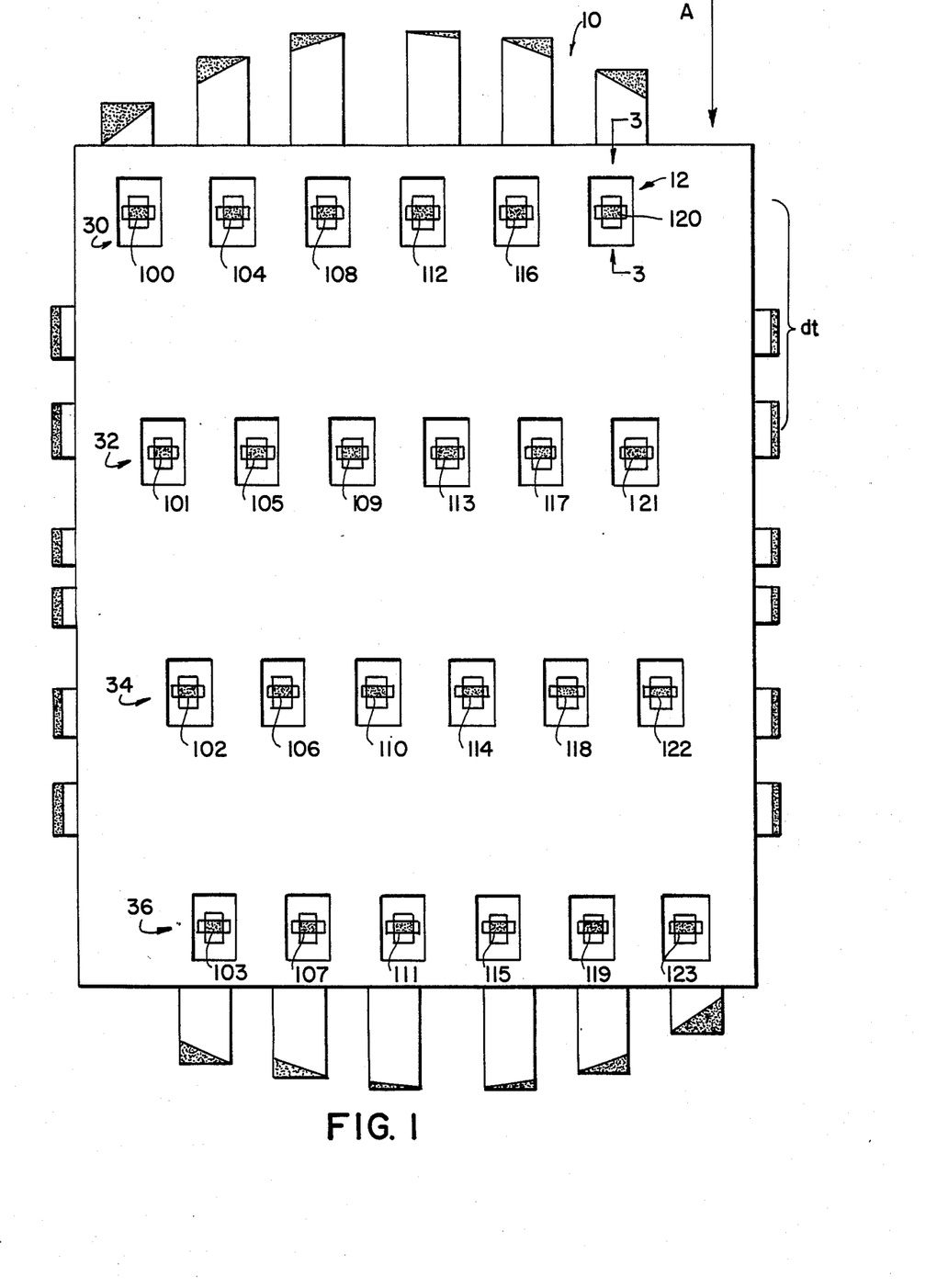
FIG. 1 is a top plan view of the preferred LED array in accordance with the dot generator system of the present invention.
Figure 2:
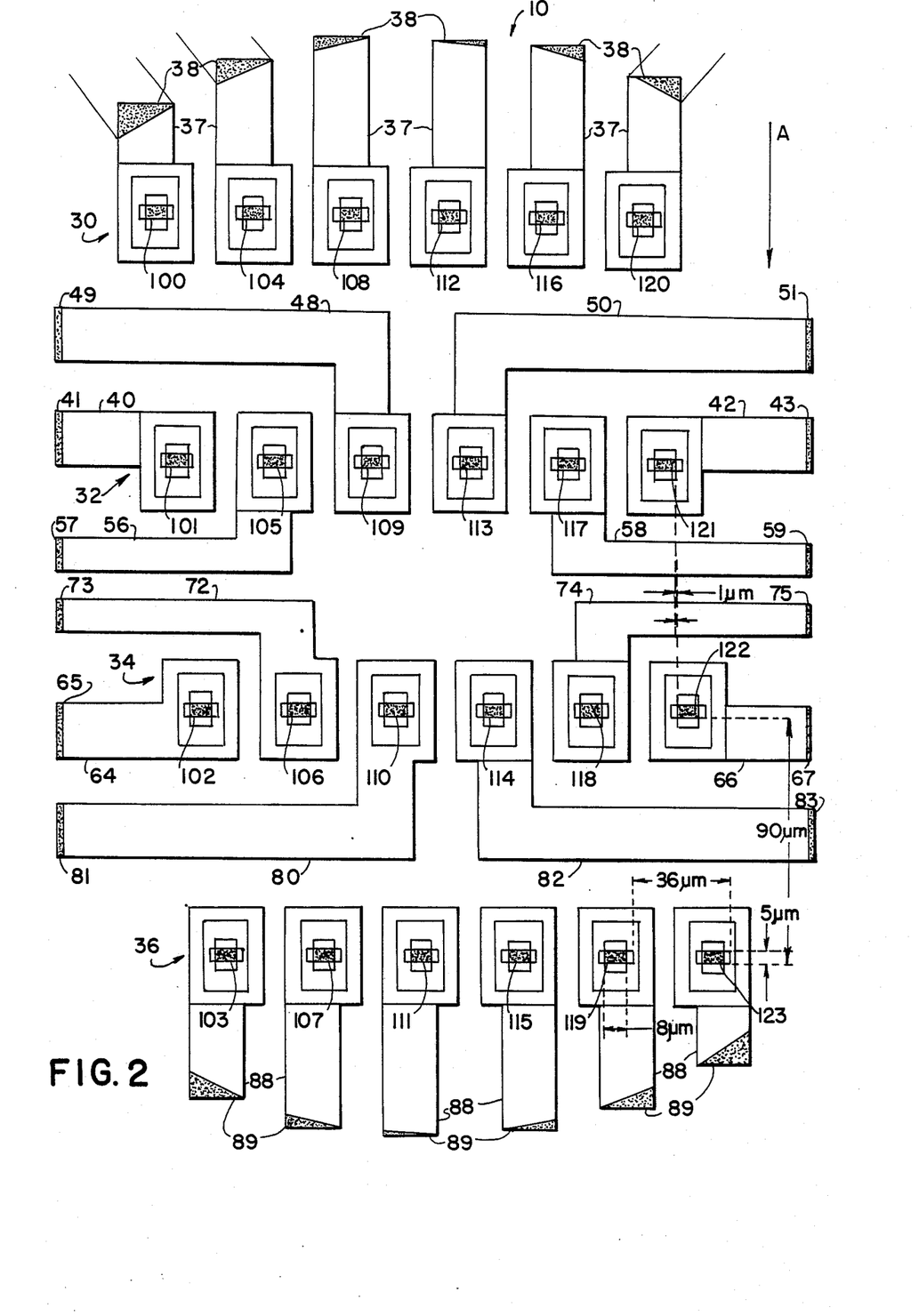
FIG. 2 is a top plan view of the LED array shown in FIG. 1 without the mask and second insulation layers.
Figure 3:
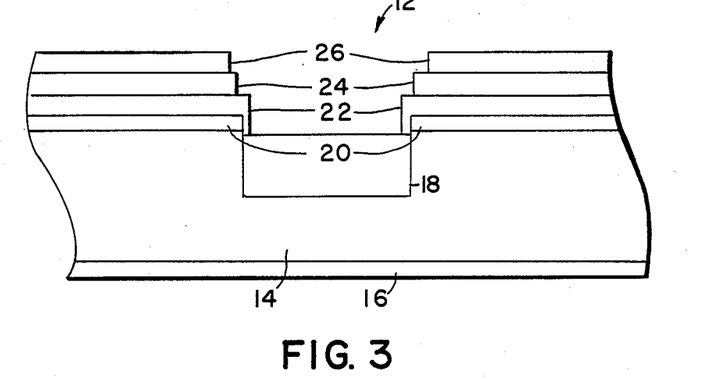
FIG. 3 is a partial cross-sectional view of one of the LED's shown in FIG. 1, taken along line 3—3 of FIG. 1.
Figure 4:
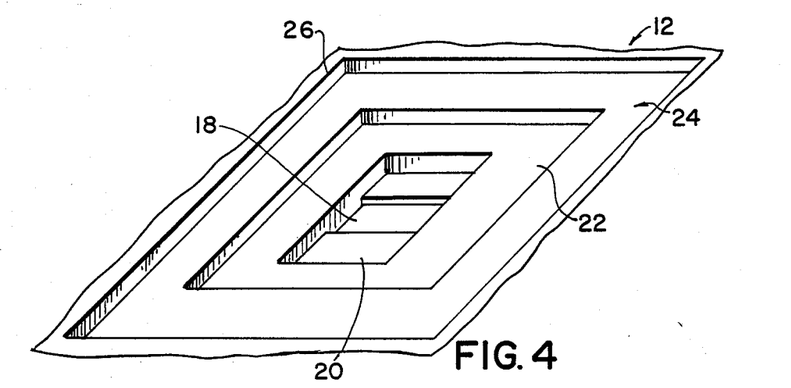
FIG. 4 is a perspective view of one LED.
Figure 5:
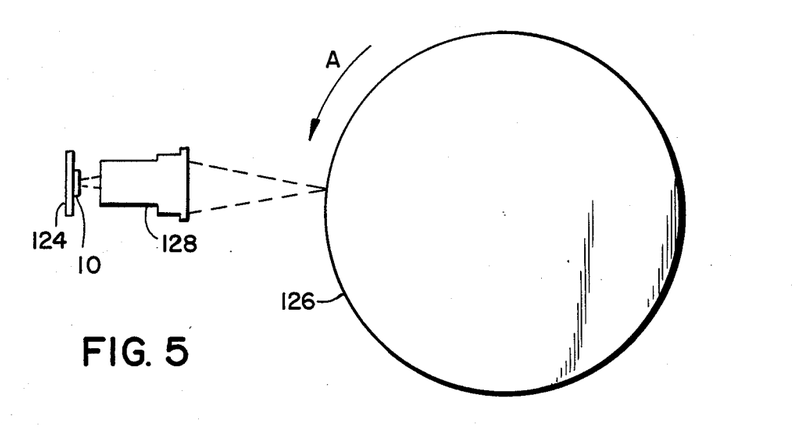
FIG. 5 is an elevation view of the preferred LED array mounted opposite the surface of a rotating exposure drum and imaged thereon by a lens.
Figure 6:
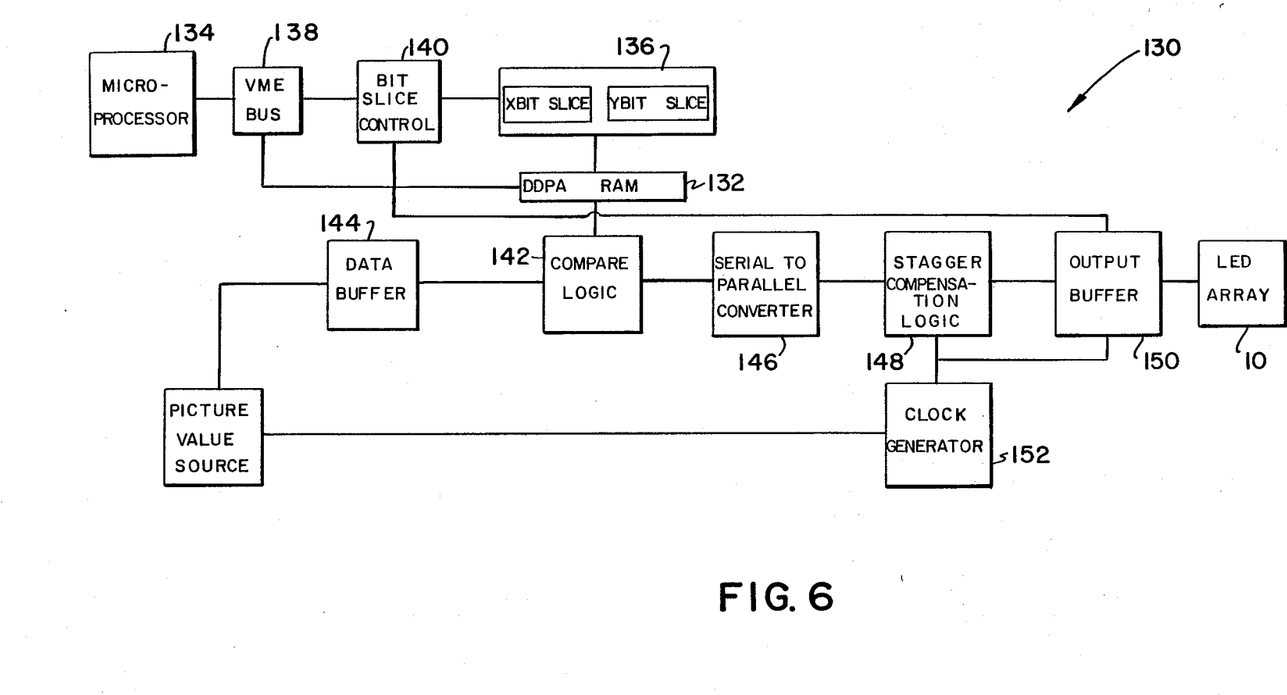
FIG. 6 is a block diagram of the dot generator system for controlling the preferred LED array.
Figure 7:
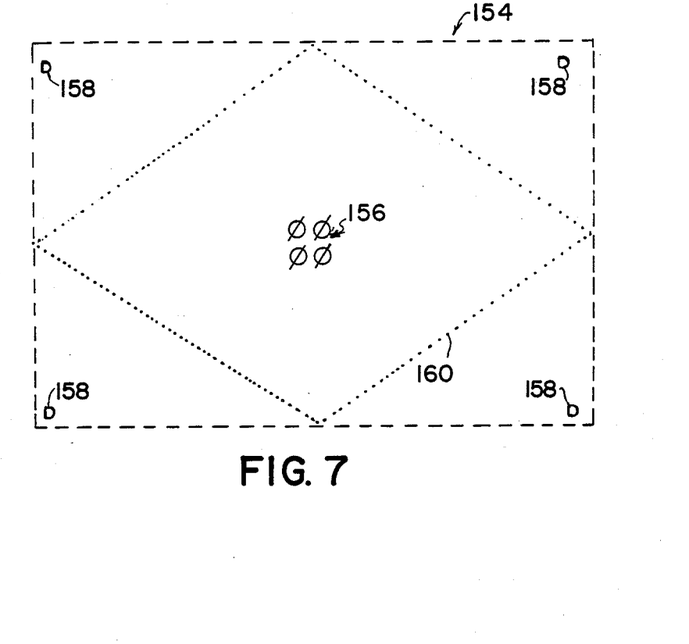
FIG. 7 is a diagrammatic illustration of a stored dot density profile array.
Figure 8:
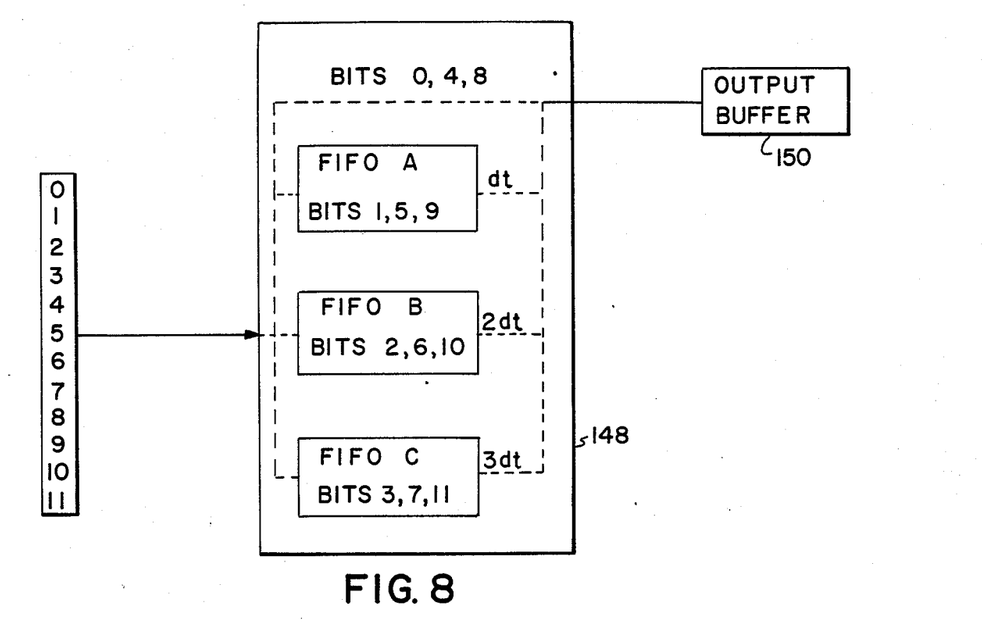
FIG. 8 is a block diagram illustration of one embodiment of a stagger compensation logic in accordance with the dot generator system of the present invention.

FIG. 1 is a top plan view of the preferred arrangement of the LED microchip array 10 utilized in the present dot generator system. The preferred LED array 10 has four staggered rows of six LED's, with each LED measuring approximately five by eight microns and spaced apart on center from the LED's of the same row by approximately thirty six microns. The scanline direction of motion of the exposure surface relative to the array is indicated by arrow A. FIG. 2, a top plan view of the preferred LED array without mask or second insulation layers, shows the preferred LED electrode configuration which obtains heretofore unknown thermal dissipation efficiency and compact spacing of the very small LED's. FIG. 3 is a partial cross-sectional view of a single LED 12 taken along line 3—3 of FIG. 1, and FIG. 4 is a perspective view of an LED 12. FIG. 5 is an elevation view of the preferred scanner configuration wherein the LED array is mounted opposite from and imaged onto the surface of a rotating exposure drum. FIG. 6 is a block diagram of the dot generator control system for controlling activation of the LED array. FIG. 7 is an illustration of a stored dot density profile array, and FIG. 8 is a block diagram illustration of a stagger compensation logic useful in the present dot generation system.

Referring more specifically to FIGS. 3 and 4, the construction of an individual LED 12 is shown. A substrate 14 of an "N" type material in contact with a common 16 is doped with a light emitting "P" type impurity to form a light emitting P type rectangular "well" region 18 within the substrate. A first insulating layer 20 is deposited over the N type surface surrounding the P type well region 18. Insulating layer 20 has a rectangular opening of a size no larger than each P type well region 18, thereby insuring that no part of the N type substrate 14 is exposed.

An electrode 22 is deposited above first insulating layer 20 surrounding rectangular well region 18. Electrode 22 extends into well region 18 and contacts the P type material contained therein. Preferably, electrode 22 contacts the P-type well at least two points on opposite sides of the well region. It is important that effective electrical contact be established between the electrode 22 and the P type material in well region 18. Other than the electrode to well region contact points, electrodes 22 are electrically isolated from substrate 14 by insulation layer 20. A second insulating layer 24 is deposited atop the electrodes 22. Rectangular openings are formed in the second insulating layer surrounding and exposing each rectangular well 18. Second insulating layer 24 covers substantially all of electrode 22, specifically including the outer perimeter of the electrode region surrounding well region 18.

A metalised masking layer 26 is deposited above second insulating layer 24. Masking layer 26 is sufficiently opaque to block stray light generated in well region 18, i.e. the LED, passing out to the side through substrate 14. The mask is electrically isolated from the electrode by second insulation layer 22, and has a rectangular opening surrounding the opening in the second insulating layer. Preferably, the opening in the masking layer is smaller than the outer perimeter of electrode 22 to ensure effective masking. The masking layer and, to some extent, the electrode, ensure that light generated within LED well region 18 directed transversely through the substrate is not visible from above the array. In this manner, stray light is suppressed and only light from well defined LED's is visible from above the array. Those skilled in the art of fabricating LED microchips will be familiar with techniques for fabricating the LED array of the present invention in accordance with the foregoing description.

As shown in the perspective view of FIG. 4, LED well region 18 is visible from above the array, surrounded by the first insulation layer 20, electrode 22, second insulation layer 24 and mask layer 26. When the LED well region is excited by passing current from electrode 22 through well region 18 and substrate 14 to common 16, the LED well 18 emits high intensity light visible from above the array, with masking layer 26 obscuring any stray light transmitted outward through the substrate to the sides of the well region.

As shown in FIGS. 1 and 2, a staggered array of LED's formed in accordance with the foregoing description provides a high resolution LED array for use in the dot generator system according to the present invention to expose high quality color separations. The preferred LED array consists of four evenly spaced parallel rows 30, 32, 34, 36, each containing six LED's. Thus, the overall shape of the array is that of a parallelogram. The exposed light-emitting well region of each LED measures about eight microns long by five microns wide, and the center to center spacing between LED's of any given row is approximately thirty six microns. Preferably, all rows are equally spaced so that the center to center distance between LED's in adjacent rows is about 90 microns In FIG. 2, the LED array of FIG. 1 is illustrated without the metalised masking layer or the second insulation layers in order to show the unique electrode pattern of the preferred LED array. As shown, the electrode leads 37 for LED's 100, 104, 108, 112, 116, 120 of the first, top row 30 are led upward to electrical contacts 38 on the top edge of the microchip array. In the second row 32, electrodes 40, 42 corresponding to LED's 101, 121 lead directly out to each side of the array to contacts 41, 43, respectively. Electrodes 48, 50 corresponding to center LED's 109, 113 lead up and outward between the first and second rows to contacts 49, 51 on each side of the array. Electrodes 56, 58 corresponding to intermediate LED's 105, 117 lead down and outward between the second and third rows 32, 34, respectively, to contacts 57, 59 on each side of the array.

Similarly, in the third row 34 electrodes 64, 66 corresponding to LED's 102, 122 lead directly out to contacts 65, 67 on each side of the array. Electrodes 72, 74 corresponding to intermediate LED's 106, 118 lead upward and outward to contacts 73, 75 on each side of the array, and electrodes 80, 82 corresponding to center LED's 110, 114 lead downward and outward to contacts 81, 83 Finally, electrode leads 88 for the LED's 103, 107, 111, 115, 119, 123 of the fourth, bottom row 36 lead downward to contacts 89 disposed along the bottom edge of the chip.

It has been found that the array geometry described above is particularly well-adapted for use in combination with the dot generating exposure system according to the present invention to expose halftone separation images onto a sheet of photosensitive material mounted on the surface of rotating exposure drum 126 opposite the LED array, with the LED array being movable parallel to the rotating drum surface (see FIG. 5). Advantageously, the staggered array can provide up to twenty four exposure beams, unlike traditional laser-based systems which typically provide only eight to ten beams, all of which are controlled by a single dot generator system. Of course, different combinations of LED's and LED rows can be activated to obtain different numbers and configurations of beams. It is also contemplated that the LED array may be movably mounted opposite other types of exposure surfaces, such as a flat surface, within the scope of the present invention. Hereinafter, the dot generator system will be discussed in the context of the preferred twenty four element, four by six row LED array mounted opposite a rotating exposure drum. As used herein, the term "active" LED means an LED activated for use during exposure, and it will be appreciated that reference to active LED's may refer to less than all LED's on the array activated for use.

The stagger geometry is quite precise, and permits accurate control over microdot size and shape without altering fundamental microdot resolution. The pitch between adjacent scan lines is determined by such factors as required output speed and picture resolution. However, with the present invention a coarse or fine pitch may be obtained at constant speed by selectively activating all LED's or a subcombination of a lesser number of LED's. The fundamental resolution of each LED remains unchanged, which is advantageous where, for example, text and graphics are to be exposed at different resolutions during the same scan. This cannot be done with a laser dot generator having a limited number of exposure beams. There, the scanning speed and/or the fundamental resolution of each beam must be altered to change the scan line pitch.

The preferred array geometry provides distinct advantages in a dot generating exposure system for a drum-type color separation scanner. First, the LED's are sufficiently small to expose fine microdots acceptable for high-resolution color separation scanning, e.g. in excess of 2,800 microdots per inch. Finer resolution may be obtained using relatively simple optical reduction. Second, the preferred geometry permits high power, on the order of 10 milliamps, to be supplied to and drive each LED at high current density to obtain an intense exposure source. Third, the four by six staggered array allows the excitation of the LED's to be timed during scanning in accordance with the system of the present invention to expose a continuous microdot line of up to twenty four immediately adjacent microdots. That is, the dot generator control system described below controls activation of each staggered row to permit displacement of the exposure scanning drum surface relative to the array in an amount equal to the distance between rows, i.e. about 90 microns, before activating the next row with corresponding exposure data.

Thus, the dot generator system of the present invention including an LED array with staggered rows and corresponding dot generator control system obviates the need for one or two rows of small, closely spaced LED's which would be subject to thermal and electrical interference between electrodes and/or LED's. Indeed, even if a linear array of twenty four LED's measuring five by eight microns could be constructed, the LED's and electrode leads would necessarily be spaced close together, resulting in thermal and/or electrical interference.

As shown in FIG. 5, the LED array 10 is mounted opposite the surface of a rotating exposure drum in a color scanner. More specifically, LED array 10 is mounted on a substrate 124 with appropriate interconnections and an image of the array is focused by a lens 128 onto the film bearing surface of rotating exposure drum 126.

As described more fully below, in the dot generator system and method of the present invention, activation of the LED's in rows 30, 32, 34, 36 is controlled so that each row is imaged at substantially the same location on the rotating exposure drum to expose a single row of up to twenty four microdots FIG. 6 illustrates in block diagram form the preferred dot generator system 130 for controlling LED array 10. Dot generator system 130 includes a dot density profile array random access memory ("DDPA RAM") 132 which stores addressable microdot density values, a microprocessor 134 for creating incremental address values for each color separation and furnishing the incremental address values to bit slices 136 via VME bus 138 and bit slice control 140. As explained more fully below, the incremental address values take into account the screen parameters, i.e. screen pitch and angle, to be superimposed on each halftone, and corresponds to the line by line activation sequence of the LED array. A compare logic 142 receives microdot density values from the DDPA RAM as accessed by bit slices 136, and compares each microdot density value to picture data received from a data buffer 144. The picture data corresponds to one pixel of a color. Based upon the comparison of the microdot density value with the picture pixel value, the compare logic determines whether each individual LED will be turned "ON" to expose a microdot on the halftone film. The compare logic supplies an exposure indication bit for each microdot of information to a serial to parallel converter 146, which accumulates the exposure indications into a word equal in bit length to the number of "active" LED's on the LED array 10. That is, although the preferred LED array contains twenty four LED's it is contemplated that it may be desirable to use less than all LED's of the array, the remaining LED's being "inactive"

The parallel exposure data word from the serial to parallel converter is furnished to a stagger compensation logic 148 which introduces appropriate time delays which take into account the staggered row construction of the LED array and the rotating speed of the exposure drum to ensure that each row of LED's is activated at substantially the same point on the surface of drum 126, thereby exposing a single line of microdots on the halftone film in response to one exposure data word from the serial to parallel converter. The time delayed exposure signals are sent by stagger compensation 148 to an output buffer 150 and on to LED array 10. A clock generator 152 monitors the timing of data transfer from output buffer 150 to array 10, triggers a stroke pulse to activate the LED array, and transmits a signal indicating when the system is ready for the next pixel of picture data to be loaded into input data buffer 144. Of course, output linearization may be applied in a known manner where appropriate, such as by including one or more output linearization look up tables applied to one or more signals in the system, e.g. the output signal of data buffer 144.

In the preferred embodiment of the invention the DDPA RAM is a 128×128 program logic array stored in static ram which stores 12 bit density values corresponding to each microdot By way of example, FIG. 7 illustrates an example of a square dot density profile 154 stored in DDPA RAM. As shown, the halftone dot uses an x, y coordinate system with the common zero 156 at the center of the array. By way of illustration, zero density values occur at the center of the dot profile 156, with maximum density values "D" occurring at each extreme corner 158 of the dot profile. For this example of a square halftone dot, fifty percent (50%) density values lie along diamond 160. Of course, other halftone dot configurations and stored density values having other than 12 bits of data may be suitable. For reasons which will become apparent, negative microdot density values are preferably stored in DDPA RAM 132.

It has advantageously been found that all addressing of DDPA RAM for a given halftone separation may be performed by continuous adding of incremental address values in a predetermined sequence. Thus, the bit slices assume all LED's of the array are arranged in a single row, i.e. as in the case of a single row of microdots exposed by a linear array. Under these circumstances, the following illustration depicts the relationship of each microdot line and scanline relative to the axis and circumference of the rotating drum.

As shown, each microdot line extends axially across the drum surface up to N microdots, which corresponds to the number of active LED's in array 10. The number of microdot lines extends to the end of the scanline in the circumferential direction and the number of scanlines extends to the end of the scan.

Advantageously, it has been found that incrementing the start DDPA RAM address across each microdot of a microdot line within one scan, introducing a flyback to reach the first microdot of the next microdot line of the same scanline, and introducing a scanline advance increment to the start DDPA address, in that order, provides simple, accurate and fast addressing of DDPA RAM 132 throughout any given scan. In accordance with the preferred method, microprocessor 134 calculates the microdot, flyback and scanline incremental address values for each halftone color separation and transmits these incremental values to the bit slices 136 prior to commencing exposure scanning. Of course, by simple trigonometry it is possible to incorporate the desired screen parameters, e.g. screen pitch and angle, for each separation into the corresponding incremental address values, so that DDPA address incrementing incorporates the selected screen angle. The microdot line incremental address values dx, dy corresponding to the distance between each microdot of a microdot line may be expressed and calculated as follows:

$$dx = \frac{(Spi \times \cos A)}{(Lpi \times N)}$$

$$dy = \frac{(Spi \times \sin A)}{(Lpi \times N)}$$

Similarly, the address increment corresponding to the flyback distance between the last microdot of one microdot line and the first microdot of the next microdot line in the same scanline may be expressed and calculated as follows:

$$fx = \frac{(Spi \times \cos A)}{Dpi} - (N - 1)dx$$

$$fy = \frac{(Spi \times \cos A)}{Dpi} - (N - 1)dy$$

Finally, the scanline increment value corresponding to the distance from the first microdot of the first microdot line of one scanline to the first microdot of the first microdot line of the next scanline may be expressed and calculated as follows:

$$lx = \frac{(Spi \times \cos A)}{Lpi}$$

$$ly = \frac{(Spi \times \sin A)}{Lpi}$$

where
Spi=required halftone screen period in number per inch
Lpi=number of scanlines per inch on output
N=number of microdot beams across one microdot line; also equal to the number of active LED's on the array
Dpi=number of microdot elements per inch in circumferential drum direction
A=required screen angle Advantageously, microprocessor 134 calculates the incremental values dx, dy, fx, fy, lx, ly for each color separation and transmits these incremental address values to bit slices 136 in advance of scanning. Thus, prior to scanning exposure bit slices 136 has in memory all incremental address parameters for each halftone separation, and DDPA RAM 132 contains addressable microdot density values.

At the beginning of each scanning exposure, bit slices 136 start at address X=0, Y=0. During sequential addressing steps, bit slices 136 add incremental values dx, dy to determine the address sequence for scanning across a row of microdots. These values are added (N−1) times, with bit slices 136 thereafter adding the row flyback values fx, fy to commence scanning the addresses for next microdot line in the same scanline. DPA RAM addresses are sequentially determined for each microdot in each microdot line within one scanline until the end of the scanline. Thereafter, bit slices 136 add scanline incremental values lx, ly to the start DDPA address corresponding to the first microdot of the first microdot line in any given scanline in order to increment to the DDPA RAM address corresponding to the first microdot of the first microdot line of the next scanline. Sequential addressing for each microdot line of each scanline continues in this manner until the end of a separation scan.

In the preferred embodiment wherein bit slices 136 each comprise a 32 bit adder with onboard memory, 32 bit adding is performed to calculate each incremental memory address. Typically, however, the address word length for DDPA RAM 142 is much shorter For example, the DDPA RAM address word length might be 12 bits. To conform the incremented address value to the DDPA address length, only the most significant digits of the incremented address value are used to indicate the next address value. However, all 32 bits continue to be included in subsequent incremental additions for accuracy. Moreover, since the dot density profile array is symetrical and repetitive, any overflow bits are ignored since this merely indicates that the incremental address values have entered the next halftone dot of the electronic screen.

The compare logic 142 preferably comprises an adder or subtracter and a comparator to determine whether the sum or difference is greater or less than zero. Preferably, the compare logic is a 12 bit digital comparator including an adder which receives a negative microdot density value from DDPA RAM 132 and a positive picture value from buffer 144 and adds the two together. Where the sum of the picture and microdot density values is greater than or equal to zero, i.e. the picture value is greater than the recalled microdot density value, the compare logic determines that an LED is to be activated corresponding to expose the corresponding microdot. Where, however, the sum is negative, i.e. the picture value is less than the recalled microdot density value, the compare logic determines that no exposure is to be made for the corresponding microdot. For each LED corresponding to one microdot, compare logic 142 transmits a single bit of data indicating whether the LED is to be turned "ON".

One or more serial to parallel converters 146 convert the single bits of exposure data received from compare logic 142 into a single exposure data word corresponding in length to the number of active LED's on array 10. By way of example, serial to parallel converter 146 would accumulate and transmit an 8 bit exposure data word if 8 LED's are activated for use on array 10, or a 12 bit data word if 12 LED's are activated for use on array 10.

Referring again to FIG. 3, serial to parallel converter 146 is also connected directly to data buffer 144. Preferably, the picture value received by and stored in buffer 144 also contains two bits of data indicating whether or not any picture is to be exposed and, if not, whether the corresponding picture area is to be completely exposed or left blank. This data is monitored by serial to parallel converter 146 and, where no picture is to be exposed, the output data from the serial to parallel converter may be "forced". That is, the exposure data word transmitted by serial to parallel converter 146 forces all active LED's on array 10 to turn on or off, as required. This is a convenient feature of the present invention since it permits, for example, a border area to be completely exposed or left blank. Advantageously, exposure of picture data may be resumed immediately after the border or other "forced" area is complete.

Up to this point the present dot generator system has been discussed as if the exposure data word transmitted by serial to parallel converter 146 corresponded directly to and would be used to activate a single line of LED's to expose a straight line of microdots. The preferred LED array, however, consists of several staggered rows of LED's. Consequently, the exposure data word must be transformed to conform to the array configuration. This requires that transmittal of the exposure data bits corresponding to each staggered LED row be timed to cause excitation of each staggered row in response to corresponding exposure data to occur at the same position on the rotating drum surface. In short, activation of the LED's must be timed so that the first row is turned on at one point on the exposure drum, with each subsequent staggered row being turned on in response to corresponding exposure data at the same point on the rotating drum.

To accomplish this result, stagger compensation logic 148 introduces an appropriate time delay before transmitting corresponding exposure data to the second and subsequent staggered rows of LED's to the LED array.

Referring to FIG. 1, the first bit of exposure data received from serial to parallel converter 66 corresponds to LED 100. The second bit corresponds to LED 101, the third bit to LED 102, and so on through as many LED's are active and to be controlled. With regard to a single exposure word received from the serial to parallel converter, stagger compensation logic 148 immediately transmits exposure data bits corresponding to the first row of LED's 30 to output buffer 150 and on to array 10 without delay. However, the stagger compensation logic delays transmitting the exposure data bits corresponding to the second row of LED's 32 for a period of time dt, where dt equals the length of time required for the rotating exposure drum to rotate until the second row of LED's is aligned with the point on the drum surface where the first row of LED's was activated with corresponding undelayed data. Similar but longer time delays are introduced before transmitting corresponding exposure data bits to the third and fourth staggered rows. Of course, where the stagger distance between the rows of LED's is constant, and the exposure drum rotates at constant speed, the time delay for data corresponding to the third LED row will be 2dt and the time delay for data corresponding to the fourth row will be 3dt.

By way of example only, where the twelve LED's corresponding to reference numerals 100 through 111 on FIG. 1 are active and are to be controlled to expose a microdot line, the stagger compensation logic transmits the first, fifth and ninth exposure data bits of an exposure data word directly to output buffer 150 without delay. The second, sixth and tenth exposure data bits are delayed for a period of time dt before being transmitted to output buffer 150. The third, seventh and eleventh data bits are delayed for a period of time 2dt before being transmitted to output buffer 150 and the fourth, eighth and twelfth data bits are delayed a period of time 3dt before being transmitted to output buffer 150.

It is contemplated that stagger compensation logic 148 may consist of a set of first in first out ("FIFO") registers corresponding to the rows of LED's for which data is to be delayed. This embodiment is illustrated in FIG. 8, which illustrates 12 bits of data received from serial to parallel converter 66. Stagger compensation logic 148 transmits the first, fifth and ninth bits directly to output buffer 150. The second, sixth and tenth bits are stored in FIFO A and are transmitted to output buffer 150 after a period of time dt. The third, seventh and eleventh bits are stored in FIFO B and are transmitted to output buffer 150 after a period of time 2dt. Similarly, the fourth, eighth and twelfth bits are stored in FIFO C and are transmitted to output buffer 150 after a period of time 3dt.

In an alternative embodiment of stagger compensation logic 148, the first, fifth and ninth bits are transmitted without delay to output buffer 150 and the entire exposure data word received from the serial to parallel converter is stored in addressable memory. After a number of clock cycles corresponding to dt, the second, sixth and tenth bits are read from memory and transmitted to output buffer 150. After a further number of clock cycles corresponding to the period of time 2dt, the third, seventh and eleventh bits of data are read out of memory and transmitted to output buffer 150. Finally, after a number of clock cycles corresponding to the period of time 3dt the fourth, eighth and eleventh bits are read from memory and transmitted to output buffer 150.

As will readily be appreciated from the foregoing discussion, the stagger compensation logic constructs and transmits to output buffer 150 an LED array exposure command word quite different from the exposure data word received from the serial to parallel convert. Thus, during ongoing scanning the stagger compensation circuit receives an exposure data word corresponding to the exposure data for one microdot line exposure on the drum surface. The stagger compensation logic transmits a modified exposure data word consisting of undelayed exposure data for the first LED row and delayed exposure data for the second, third and fourth LED rows, as to which first row exposures have previously been completed. Thus, during ongoing scanning, the LED array simultaneously exposes four different portions of four different microdot rows on the photosensitive material.

Output buffer 150 receives the modified exposure data word from stagger compensation logic 148 and, in response to a clock pulse from clock generator 152, transmits the modified exposure command data to LED array 10.

Clock generator 152 is connected to stagger compensation logic 148, output buffer 150, LED array 10 and to the source of the picture value data. Thus, the clock generator controls the timing of transmittal of data from output buffer 150 to array 10 and provides a stroke pulse directly to the array to trigger the array in response to the modified exposure data received from output buffer 150. The clock also controls the timing sequence of the stagger compensation logic and each transmittal of a new exposure command word from the stagger compensation logic to output buffer 150. Finally, the clock generator sends a pulse to the picture data source each time the dot generator system is ready for a new picture value to be loaded into data buffer 144. Of course, since the size of one microdot is much smaller than one scanned pixel of picture data, the same picture value stored in buffer 144 is compared multiple times with microdot density values recalled from DDPA RAM 132. Consequently, the clock generator signal to the picture data source is sent after a predetermined number of comparisons have been performed using one picture value.

As shown in FIG. 6, bit slice control 140 monitors output buffer 150 so that addressing of the DDPA RAM is consistent with the timing of output buffer 150. Because transmittal of exposure command data from output buffer 150 is determinative of the transmittal of data from stagger compensation 148 to output buffer 150 and, hence, from serial to parallel converter 146 to stagger compensation 148, the timing of data transmitted by output buffer 150 is also indicative of the availability of serial to parallel converter to receive new exposure bits from compare logic 142. Therefore, monitoring of the output buffer by the bit slice control is indicative of the appropriate timing for bit slices 136 to perform additional DDPA RAM addressing and density value comparisons in order to replenish serial to parallel converter 146.

Finally, it is also contemplated that one or more output linearization look up tables may be necessary to ensure a linear response of the digital dot generating system. By way of example, such a linearization look up table might be connected to the picture data buffer and/or to the output buffer to ensure a linear exposure signal.

In operation, DDPA RAM 132 is addressably loaded at start up by microprocessor 134, via VME bus 138, bit slice control 140 and bit slices 136 with negative microdot density values corresponding to the desired halftone dot profile. Prior to commencement of scanning, the microprocessor calculates the microdot line incremental address values dx, dy, the microdot line flyback incremental address values fx, fy, and the scanline advance incremental address values lx, ly and transmits these values to be stored by x and y bit slices 136.

During scanning, bit slices 136 under the direction of bit slice control 140, increment the DDPA RAM address across a microdot line by successively adding dx, dy to the initial start address. After completing a microdot line, i.e. by conducting (N−1) additions of dx, dy to reach the end of the LED array, the bit slices increment the DDPA RAM address by fx, fy in order to flyback to the first microdot of the next row in the same scanline. After completion of one scanline, bit slices 136 add lx, ly to the DDPA start address to increment the DDPA RAM address to the first microdot of the first microdot line of the next scanline. Incremental addressing continues in this manner until the end of a halftone exposure scan. Advantageously, since incremental address values and separate running addresses for all four halftone separations are stored in bit slices 136, the dot generator system can readily alternate between halftone exposures during exposure drum rotation to produce multiple separations on one piece of film. Alternatively, upon completion of one halftone separation exposure the bit slices are capable of immediately commencing the next halftone exposure without any need to have the microprocessor recalculate and load incremental address values.

Compare logic 142 compares microdot density values received from DDPA RAM 132 with a picture value received from data buffer 144, preferably by adding the negative microdot density value to the positive picture value and looking at the resulting sum. The compare logic transmits a single bit of on or off data corresponding to one microdot and, hence, one LED to serial to parallel converter 146. The serial to parallel converter accumulates bits of exposure data from the compare logic and builds an exposure data word corresponding in length to the number of active LED's on the LED array and, hence, to the number of microdots to be exposed during a single exposure stroke. Stagger compensation 148 receives the exposure data word from serial to parallel converter 146 and introduces appropriate time delays to bits corresponding to LED's in the second and subsequent staggered LED rows. The stagger compensation transmits to output buffer 150 a modified exposure word containing exposure data for up to four portions of different microdot lines to be exposed by the LED array. Clock generator 152 provides a time reference for the delays introduced by stagger compensation 148 and controls the timing of transmittal of exposure data from output buffer 150 to array 10, activation of the LED array, and transmittal of a request from dot generator system 130 to the picture value source to obtain the next pixel picture value to be processed and exposed. Bit slice control 140 monitors the output of output buffer 150 in order to coordinate the timing of address sequencing by bit slices 130 and comparisons of microdot density values in order to replenish the serial to parallel converter.

Although particular illustrative embodiments of the present invention have been described herein, the present invention is not so limited. Various changes, substitutions and modifications may be made thereto by those skilled in the art without departing from the spirit or scope of the invention, as defined in the appended claims. By way of example only, it may be possible to construct and utilize in accordance with the present invention an LED microchip array having greater or less than twenty four LED's arranged in various configurations of staggered rows other than the preferred four by six staggered row array. It will also be appreciated that terms used in the foregoing disclosure, specifically including but not limited to "light", "top", "bottom", "center", "intermediate", "active" and "inactive" are used for convenience in describing the invention and are not restrictive thereof.

What is claimed is:

1. A dot generator system for a color scanner including means for providing a picture value for use in exposing a halftone separation comprising:
   an LED microchip array having multiple staggered rows of LED's, said LED microchip array being mounted opposite to and imaged upon the exposure surface of a color scanner, said LED microchip array being movable in a two dimensional coordinate system relative to said exposure surface;
   an addressable stored dot density profile array, said dot density profile array having a microdot density value stored at each memory address;
   bit slice means for determining a dot density profile array address value and recalling the corresponding microdot density value;
   compare logic means for comparing said recalled microdot density value with a picture value to determine whether an LED on said LED array will be activated, said compare logic means transmitting an exposure data bit indicating whether the corresponding LED is to be activated;
   serial to parallel converter means for receiving said exposure data bits from said compare logic means and accumulating said bits to construct an exposure data word equal in length to the number of active LED's on said LED array;
   stagger compensation logic means for receiving said exposure data word from said serial to parallel converter means, said stagger compensation means introducing delay timing to data bits corresponding to at least some of said staggered LED rows, said delay timing being equal to the time required for said LED microchip array to traverse the distance on said exposure surface between each staggered row and the first row;
   output buffer means for receiving a modified exposure data word from said stagger compensation means and transmitting said modified exposure data word to said LED array; and
   clock generator means for providing a timing reference for said delay timing and transmittal of said modified exposure data word from said output buffer to said LED array, said clock generator means also providing a stroke pulse to said LED array and a picture value request pulse for signaling the color scanner that the dot generator system is ready to receive the next picture value.

2. The dot generator system according to claim 1 wherein said LED microchip array further comprises:
   a substrate in electrical contact with a common;
   a plurality of LEDs fabricated in said substrate;
   a first insulating layer disposed above said substrate surrounding said LED's;
   a plurality of electrodes disposed above said first insulating layer, each said electrode corresponding to and in electrical contact with one of said LED's, said electrodes being electrically isolated from said substrate by said first insulating layer;
   a second insulating layer disposed above said electrodes, said second insulating layer having a plurality of openings corresponding in number and position to said LED's;
   a mask layer disposed above said second insulating layer, said mask layer having a plurality of mask openings corresponding in number and position to said LED's, said mask layer being electrically isolated from said electrodes and said LED's by said second insulating layer.

3. The dot generator system according to claim 2, wherein said LED array further comprises at least four staggered rows of LED's, each said row having at least six uniformly spaced LED's.

4. The dot generator system according to claim 3, wherein said uniformly spaced LED's are approximately eight microns long in the LED row direction and approximately five microns wide in the direction transverse to the row.

5. The dot generator system according to claim 4, wherein said uniformly spaced LED's within each row are approximately thirty six microns on center.

6. The dot generator system according to claim 5, wherein said staggered LED rows are spaced apart approximately ninety microns.

7. The dot generator system according to claim 3, wherein said electrodes for the first row of LED's are led upward to contacts on the top edge of the microchip array and said electrodes for the fourth row of LED's are led downward to contacts on the bottom edge of the microchip array.

8. The dot generator system according to claim 7, wherein said electrodes for the end LED's of each of said second and third rows are led outward to contacts on each side of the monolithic array.

9. The dot generator system according to claim 8, wherein said electrodes for the intermediate LED's adjacent said end electrodes of said second and third rows are led upward and outward between said first and second LED rows to contacts on either side of the microchip array.

10. The dot generator system according to claim 9 wherein said electrodes for the center LED's of said second and third rows are led downward and outward between LED rows to contacts on either side of the microchip array.

11. The dot generator system according to claim 10 wherein said LED's are approximately eight microns long and approximately five microns wide to obtain microdot resolutions exceeding 2,800 microdots per inch.

12. The dot generator system according to claim 1 wherein said dot density profile array further comprises a programmable logic array and said stored microdot density values are negative.

13. The dot generator system according to claim 1 wherein said exposure surface further comprises the surface of a rotating exposure drum, said LED microchip array being mounted opposite said rotating drum exposure surface, said LED microchip array being movable parallel to the axis of said drum, whereby said LED microchip array, as driven by said output buffer means and clock generator means in response to said exposure data word transmitted from said serial to parallel converter to said stagger compensation means, illuminates on said rotating drum exposure surface an image of a microdot line containing a number of microdots equal in number to the number of active LED's on the array, said microdot line being substantially parallel to the drum axis.

14. The dot generator system according to claim 13 wherein said LED array exposes successive microdot lines in a scanline direction around the circumference of said rotating drum, whereupon said LED array is moved parallel to the drum surface to commence exposure of the next scanline.

15. The dot generator system according to claim 14 wherein said bit slice means sequentially increments a start dot density profile array address value by applying microdot increment values dx, dy to increment the address value across a microdot line equal in length to the number of active LED's on said LED array, said bit slice means thereafter applying flyback increment values fx, fy to increment the address value from the last microdot of one microdot line to the first microdot of the next microdot line, said bit slice means applying said microdot increment values and said flyback increment values until the end of one scanline is reached, whereupon said bit slice means applies a scanline increment value to said start dot density profile address value to increment to the address value corresponding to the first microdot of the first microdot line of the next scanline, said bit slice means applying said microdot, flyback and scanline increment values until a scanning exposure is complete.

16. The dot generator system according to claim 1 wherein said compare logic means sums said negative microdot density value and said picture value, said compare logic means transmitting an exposure data bit indicating that an LED is to be turned "ON" if said sum is greater than or equal to zero, said compare logic means transmitting an exposure data bit indicating that an LED is to remain "OFF" if said sum is less than zero.

17. The dot generator system according to claim 13 wherein said LED microchip array includes four staggered rows of LED's.

18. The dot generator system according to claim 17 wherein said stagger compensation logic means further comprise a set of FIFO registers, said stagger compensation logic means transmitting to said output buffer without delay exposure data word bits corresponding to the first row of LED's, said stagger compensation logic means storing in a first FIFO register exposure data word bits corresponding to the second row of LED's, said second row data bits being transmitted to said output buffer after a period of time corresponding to the length of time required for said rotating drum to traverse the circumferential distance between the images of said first and second rows on said drum surface, said stagger compensation logic means storing in a second FIFO register exposure data word bits corresponding to the third row of LED's, said third row data bits being transmitted to said output buffer after a period of time corresponding to the time required for said rotating scanning drum to traverse the circumferential distance between the images of said first and third rows on said drum surface, said stagger compensation logic means storing in a third FIFO exposure register data word bits corresponding to the fourth row of LED's, said fourth row data bits being transmitted to said output buffer after a period of time corresponding to the length of time required for said rotating drum to traverse the circumferential distance between the images of said first and fourth rows on said drum surface.

19. The dot generator system according to claim 17 wherein said stagger compensation logic means stores each exposure data word received from said serial to parallel converter and transmits a modified exposure data word to said output buffer means, said modified data word consisting of first row exposure data bits corresponding to the first row of LED's, said first row exposure bits being read from a first exposure word consisting of the immediately preceding exposure data word received from said serial to parallel converter means;

second row exposure data bits corresponding to the second row of LED's, said second row exposure data bits being read from a second exposure word stored in memory, said second exposure word having been stored for a period of time corresponding to the time required for said rotating drum to traverse the circumferential distance between the images on said drum surface of said first and second LED rows;

third row exposure data bits corresponding to the third row of LED's, said third row exposure data bits being read from a third exposure word stored in memory, said third exposure word having been stored for a period of time corresponding to the time required for said rotating drum to traverse the circumferential distance between the images on said drum surface of said first and third LED rows;

fourth row exposure data bits corresponding to the fourth row of LED's, said fourth row exposure data bits being read from a third exposure word stored in memory, said third exposure word having been stored for a period of time corresponding to the time required for said rotating drum to traverse the circumferential distance between the images on said drum surface of said first and fourth LED rows.

20. The dot generator system according to claim 1 further comprising bit slice control means for monitoring said output buffer means to coordinate the timing of address sequencing by said bit slice means with availability of said serial to parallel converter.

21. A method of generating halftone separation images in a color scanner including means for providing picture values, the method comprising:

providing an LED microchip array having multiple staggered rows of LED's;

mounting said LED microchip array opposite and movable in two dimensions relative to an exposure surface;

projecting an image of said LED microchip array onto said exposure surface;

providing an addressable dot density profile array, said addressable dot density profile array storing a microdot density value at each memory address;

addressing said addressable dot density profile array with a dot density profile array address to retrieve a microdot density value;

comparing said microdot density value with a picture value to produce an exposure data bit indicating whether a corresponding LED on said LED microchip array is to be activated;

applying microdot, flyback and scanline increment values to said dot density profile array address to advance to the next microdot density value corresponding to the next microdot to be exposed onto a photosensitive sheet disposed on said exposure surface in a microdot line by microdot line and scanline by scanline scanning exposure;

accumulating a number of said exposure data bits equal to the number of active LED's on said LED microchip array to produce an exposure data word;

modifying said exposure data word to compensate for the staggered configuration of said LED microchip array;

activating said LED microchip array in response to said modified exposure data word.

22. The method according to claim 21 wherein said exposure surface further comprises the surface of a rotating exposure drum, said LED microchip array being movable parallel to the drum axis.

23. The method according to claim 22 wherein said exposure data word is modified by delaying exposure bits corresponding to LED's of successive staggered rows for delay periods corresponding to each row equal to the time required for said rotating drum to traverse the circumferential distance between the first LED row and each staggered row.

24. The method according to claim 22 wherein said LED microchip array further includes four staggered rows of LED's.

25. The method according to claim 24 wherein said modifying step further comprises the steps of:
  storing each exposure data word in the order received; preparing a modified exposure word by reading first LED row exposure data bits from the most recently received exposure data word;
  reading second LED row exposure data bits from a second exposure data word stored in memory for a first delay period;
  reading third LED row exposure data bits from a third exposure data word stored in memory for a second delay period; and
  reading fourth LED row exposure data bits from a fourth exposure data word stored in memory for a third delay period.

26. The method according to claim 25 wherein said first delay period corresponds to the time required for said rotating drum to traverse the circumferential distance between the images of said first and second LED rows on said drum surface, said second delay period corresponds to the time required for said rotating drum to traverse the circumferential distance between the images of said first and third LED rows on said drum surface, and said third delay period corresponds to the time required for said rotating drum to traverse the circumferential distance between the images of said first and fourth LED rows on said drum surface.

27. The method according to claim 21 wherein said microdot density values are stored as negative numbers and said comparing step further comprises:
  summing said microdot density value to said picture value;
  where said sum is greater than or equal to zero, producing an exposure data bit indicating that a corresponding LED is to be activated; and
  where said sum is less than zero, producing an exposure data bit indicating that a corresponding LED is not to be activated.

28. The method according to claim 21 wherein said step of applying microdot, flyback and scanline increment values further comprises:
  sequentially adding said microdot increment values to a start dot density profile array address $(N-1)$ times before adding said flyback increment values to said dot density profile array address, where $N=$ the number of active LED's on the microchip array;
  sequentially adding said microdot and flyback increment values until the end of a scanline in the circumferential direction on said rotating drum is reached;
  adding said scanline incremental values to said start dot density profile array address to reach the dot density profile array address corresponding to the first microdot of the first microdot line of the next scanline in order to commence addressing for the next scanline.

* * * * *